United States Patent
Kar et al.

(10) Patent No.: US 9,996,162 B2
(45) Date of Patent: Jun. 12, 2018

(54) WEARABLE SENSOR SYSTEM FOR PROVIDING A PERSONAL MAGNETIC FIELD AND TECHNIQUES FOR HORIZONTAL LOCALIZATION UTILIZING THE SAME

(71) Applicant: Intel Corporation, Santa Clara, CA (US)

(72) Inventors: Swarnendu Kar, Hillsboro, OR (US); Jeremy Parra, Beaverton, OR (US); Saurin Shah, Portland, OR (US); Brian K. Vogel, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 14/976,750

(22) Filed: Dec. 21, 2015

(65) Prior Publication Data

US 2017/0177089 A1    Jun. 22, 2017

(51) Int. Cl.
*G06F 3/01* (2006.01)

(52) U.S. Cl.
CPC ............ *G06F 3/017* (2013.01); *G06F 3/014* (2013.01); *G10H 2220/321* (2013.01)

(58) Field of Classification Search
CPC .... G06F 3/014; G06F 3/017; G10H 2220/321
See application file for complete search history.

(56) References Cited

U.S. PATENT DOCUMENTS

| | | | |
|---|---|---|---|
| 9,141,194 B1* | 9/2015 | Keyes | G06F 3/017 |
| 2010/0277304 A1* | 11/2010 | Haartsen | G06F 1/3215 |
| | | | 340/531 |
| 2013/0289384 A1* | 10/2013 | Jenison | A61N 1/08 |
| | | | 600/411 |

(Continued)

FOREIGN PATENT DOCUMENTS

| WO | 2006031731 A2 | 3/2006 |
|---|---|---|
| WO | 2015-002615 A1 | 1/2015 |

OTHER PUBLICATIONS

International Search Report and Written Opinion issued in PCT Application No. PCT/US2016/062904, dated Feb. 24, 2017, 15 pages.

(Continued)

*Primary Examiner* — Lisa Landis
(74) *Attorney, Agent, or Firm* — Grossman, Tucker, Perreault & Pfleger, PLLC

(57) ABSTRACT

A wearable sensor system is disclosed that provides a measurable magnetic field that changes horizontally within the range of motion of human limbs. The wearable sensor system includes a magnetic sensing device, and one or more magnet devices that provide the measurable magnetic field with a strength exceeding the Earth's magnetic field. To this end, the magnetic sensing system provides a "personal" magnetic field about a user, with that magnetic field traveling with the user and overpowering adjacent interfering fields. The wearable sensor system may include a sensor arrangement that measures a strength of the personal mag- (Continued)

netic field and field direction to perform horizontal localization, and may send a representation of a same to a remote computing device to cause an action to occur. Some such actions include output of pre-recorded or synthesized musical notes, for example.

20 Claims, 10 Drawing Sheets

(56) References Cited

U.S. PATENT DOCUMENTS

| | | |
|---|---|---|
| 2013/0311132 A1 | 11/2013 | Tobita |
| 2015/0338926 A1 | 11/2015 | Park et al. |
| 2016/0354012 A1* | 12/2016 | Zeng .................... A61B 5/1072 |

OTHER PUBLICATIONS

Roetenberg, Daniel; "Inertial and Magnetic Sensing of Human Motion"; ISBN-10: 90-9020620-5; ISBN-13: 978-90-9020620-2; 2006, 128 pages.
Furniss, Maureen; "Motion Capture"; MIT Communications Forum; 2000, 12 pages.

* cited by examiner

… (1)

WEARABLE SENSOR SYSTEM FOR PROVIDING A PERSONAL MAGNETIC FIELD AND TECHNIQUES FOR HORIZONTAL LOCALIZATION UTILIZING THE SAME

FIELD

The present disclosure is generally directed to wearable sensor systems for tracking user movements, and more particularly, to techniques for identifying a horizontal region of a wearable sensor device relative to one or more magnetic fields disposed around a user.

BACKGROUND

Wearable computing devices continue to increase in popularity, and feature increasingly sophisticated functionality including wireless capabilities. Ubiquitous to this trend are wearable computing devices that offer so-called "natural" input methods such as through gesture recognition. Personal-assistant applications, internet browsing, and general device usage may be partly or entirely controllable by these natural input methods.

One particular application particularly well suited for such natural input includes music generation. For instance, wearable or otherwise portable computing devices may perform gesture recognition to produce/generate musical notes at particular tempos and characteristics (tone, pitch, and so on) relative to the extent of a particular hand or body movement. The musical notes may be pre-recorded notes from a particular instruments (e.g., a piano), or synthesized, depending on a desired sound modality. Thus a user may perform a musical score without necessarily having an instrument, and may seem to generate music "out of thin air."

However, natural input systems by their nature generally must account for complexities and issues related to the degree of freedom a user has to gesture or otherwise perform body movements. For instance, a simple clapping gesture (e.g., bringing hands together in a rapid motion) may be performed in a variety of different ways by different users, or even by a same user. Thus allowing a high degree of user freedom while also accurately recognizing body movements present numerous non-trivial challenges.

Figure 1A:
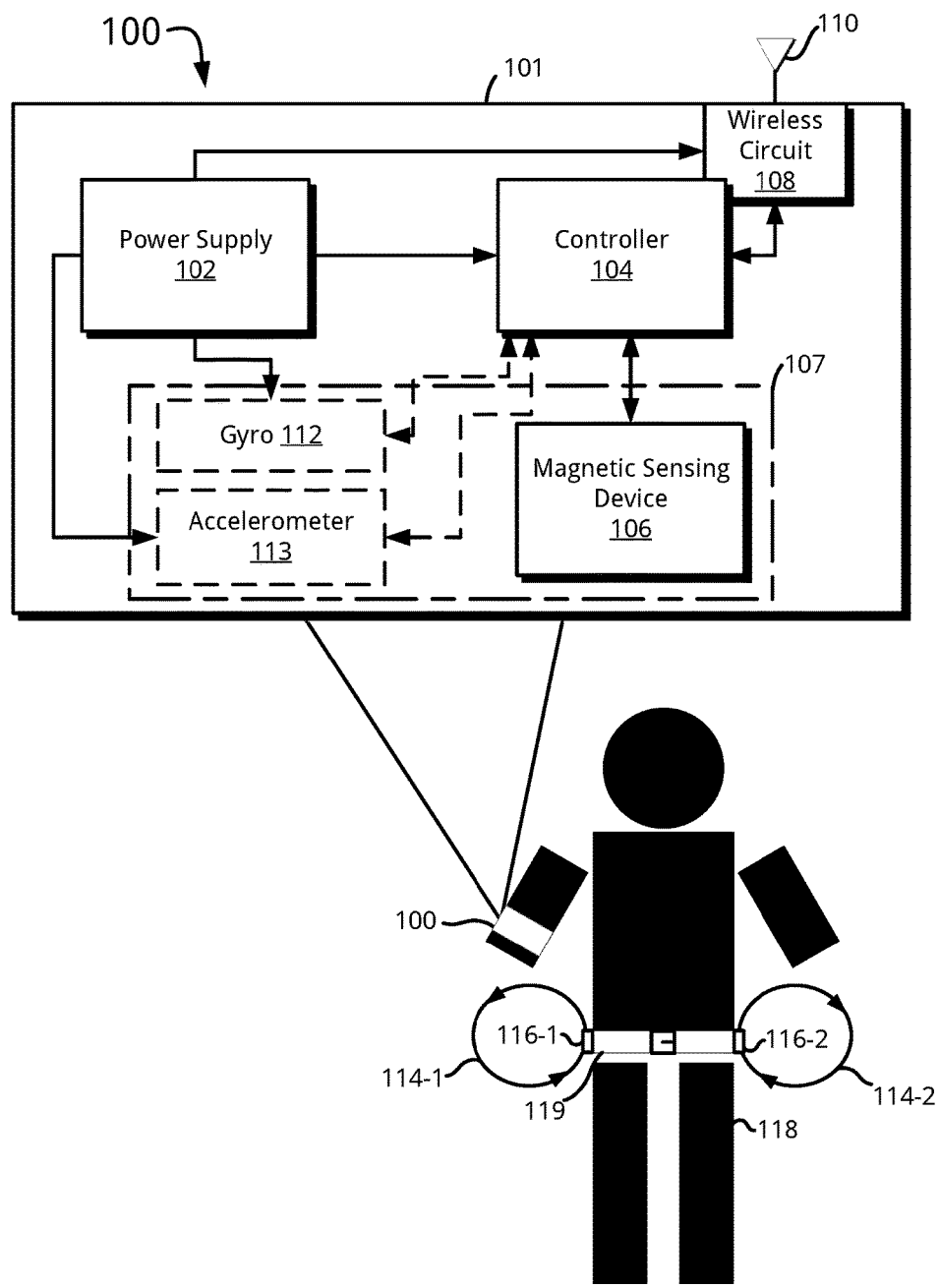
FIG. 1A illustrates a block diagram of an example wearable sensor system in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

As discussed above, natural input systems allow for a high degree of user freedom such that a user is not necessarily concerned with exact hand/body positions. For example, a user may seek to play "air drums" by moving their hands and arms in an up-down motion that approximates playing real drums, and have a natural input system translate those movements into an audible drum beat. In addition, a user may also desire to change from a first drum to a second drum based on, for example, moving one or both hands laterally/horizontally to different positions and repeating the same up-down motion. Thus complex natural input, such as described above, includes multiple considerations that a natural input system must account for without undesirably hindering or otherwise limiting the range of acceptable user input.

One approach to a natural input system configured to translate a user's body motion into an action, such as outputting a musical note or other sound, includes a wearable sensor arrangement that has an accelerometer, gyroscope and magnetometer (AGM) sensor. AGM sensors are particularly well suited for determining a particular vertical orientation at any given time. An AGM can infer, for example, whether a palm is pointing up or down based on a yaw, roll and pitch from a gyroscope, and a vertical position based on acceleration measured by the accelerometer. While an AGM may compute such orientation in part by referencing Earth's gravity and magnetic field sensed by an accelerometer and magnetometer, respectively, a horizontal location based on the same is not possible. For instance, an AGM cannot reliably infer whether the palm is relatively close to the user's body or away from the body. This is because the properties of Earth's magnetic field prevents an AGM from registering one horizontal location versus another because the magnetic field remains relatively consistent at each position.

Other approaches utilize fixed cameras/sensors that track user hand positions to cause an action, such as producing music. However, such approaches require a user to be relatively close to the sensors, which are generally fixed on a table/mount. This may undesirably limit a user's freedom of movement.

Yet another approach utilizes global positioning satellites (GPS) and Wi-Fi signal strength to perform localization. However, such approaches are relatively slow (e.g., have a slow response time) and are not particularly well suited to gestures that require precision. For example, music generation requires a degree of precision as each hand/body movement corresponds to a particular sound/tone desired by a user. A perceivable delay and/or non-accurate gesture detection may result in a less than satisfactory musical output.

Thus, in accordance with an embodiment of the present disclosure, a wearable sensor system or device is disclosed that provides a measurable magnetic field that changes horizontally within the range of motion of human limbs. In an embodiment, the wearable sensor system includes a magnetic sensor device, and one or more magnet devices that provide the measurable magnetic field. Aspects disclosed herein manifest an appreciation that gravity is a measurable field, but is limited to vertical localization schemes alone. Earth's magnetic field has a horizontal acting field, but does not change within human dimensions such that one horizontal position may be accurately determined versus another horizontal position. To this end, the wearable sensor system includes wearable magnet devices which are configured with a nominal magnetic strength that exceeds the Earth's magnetic field strength by a predefined degree. To this end, the wearable sensor system provides a "personal" magnetic field about a user, with that magnetic field traveling with the user and overpowering adjacent interfering fields (e.g., the Earth's magnetic field), thus providing a predictable/measurable field around the user's body. The wearable sensor system may include an AGM sensor arrangement that utilizes the personal magnetic field strength and direction to perform horizontal localization. Thus, and in accordance with an embodiment, a controller of the wearable sensor system may receive data output by the AGM sensor arrangement and perform vertical localization, horizontal localization, general orientation analysis (e.g., yaw, roll and pitch), or any combination thereof.

In more detail, and in accordance with an embodiment, the wearable sensor system includes a sensor arrangement with at least one magnetic sensing device. Some such example magnetic sensing devices include dual-axis or tri-axis magnetometer devices. Non-limiting examples of magnetic sensing devices suitable for use in various embodiments disclosed herein include a solid-state Hall Effect sensor, magneto-diode, magneto-transistor, anisotropic magnetoresistance (AMR) magnetometer, giant magnetoresistance (GMR) magnetometer, magnetic tunnel junction magnetometer, magneto-optical sensor, Lorentz force based Microelectromechanical systems (MEMS) sensor, Electron Tunneling based MEMS, and a MEMS compass.

The Earth's magnetic field is about 24 to 65 microTesla. To this end, the magnet devices may be configured with a nominal strength that exceeds 65 microTesla. Some specific example strengths include 2×, 3×, 5×, 10×, 20×, 30× the Earth's magnetic field. The particular strength chosen is not particularly relevant to the present disclosure so long as the wearable sensor system has a field strength that exceeds the Earth's magnetic field and is suitable for performing horizontal localization as disclosed herein. Some non-limiting example magnet devices suitable for use include permanent magnets and electromagnetic magnets. For example, the one or more magnet devices may be made of ferromagnetic materials including, for instance, iron, nickel, cobalt, or alloys thereof. In other cases, the one or more magnet devices comprise electromagnets with one or more coils of wire that magnetize when an electric current is provided. As should be appreciated in light of this disclosure, other magnet devices and magnet materials are within the scope of this disclosure.

In use, the wearable sensor system may receive measurements corresponding to an absolute intensity and direction of an adjacent magnetic field. The wearable sensor system may use the same to perform horizontal localization to identify a particular horizontal region of the wearable sensor system. In one specific example embodiment, the particular horizontal region corresponds to one of at least four detectable regions relative to a user's right hand and at least one of four detectable regions relative to a user's left hand. The wearable sensor system may also receive measurements from an accelerometer or gyroscope, or both. In any event, the wearable sensor system may utilize the identified horizontal region, vertical location, and orientation to generate one or more action event messages. The wearable sensor system may send the one or more action event messages to a remote computing system via, for example, a wireless link. In turn, the remote computing system may receive the action event messages and perform a corresponding action such as, for example, outputting a synthesized musical note or pre-recorded sound.

In one specific example embodiment, a portion of the wearable sensor system is implemented into a band that may be worn around a user's palm. In this particular example, the portion around the palm may include a magnetic sensing device such as an AGM sensor arrangement and a wireless transceiver circuit. The user may further wear a second portion of the wearable sensor system implemented in a belt-worn device that provides first and second magnet devices disposed on opposite sides of the belt (e.g., 180 degrees apart). For example, each magnet device may generally be disposed on a right and left side of a user, respectively, when the belt-worn device is worn by the user. The first and second magnet devices may be configured lengthwise such that their poles extend parallel with the belt-worn device along a horizontal axis. In addition, the first and second magnet devices may be configured to provide magnetic fields having opposite orientations based on the north pole of the first magnet device generally aligning with the south pole of the second magnet device. Thus a third magnetic field may be introduced between the first and second magnet devices based on their opposite poles magnetically attracting and reinforcing one another. As should be appreciated, if the orientations of the first and second magnets are not opposite, then a third magnetic field may not be introduced because poles of the first magnet device may repel the poles of the second magnet device, and vice-versa.

Thus the belt-worn device may provide three magnetic fields about a user when worn, with each magnetic field introducing predictable magnetic field lines that a magnetic sensor device may measure and use to determine which horizontal region the magnetic sensing device is presently disposed in. Accordingly, as a user moves their palm from one horizontal/lateral region to another, the horizontal region may be localized relative to a measured magnetic field strength indicating proximity to the first magnetic field, the second magnetic field, or the third magnetic field. As will be appreciated in light of this disclosure, the measured field strength alone may not be sufficient to distinguish one horizontal region over another. For example, two or more regions may be characterized by similar field strengths. In such cases, and as discussed further below with reference to FIGS. 3A and 3B, a measured direction of the magnetic field in combination with the measured field strength may be utilized to distinguish one horizontal region over another.

In an embodiment, the wearable sensor system may utilize the localized horizontal region alone or in combination with other output data of the AGM sensor arrangement to provide an action event message to a remote computing device via, for example, the wireless transceiver circuit. Thus, as discussed in previous examples, a user may play the "air drums" and cause the remote computing device to output pre-recorded drum sounds for N number of drums that may correspond to identifiable horizontal regions. Moreover, given additional information such as velocity based on an acceleration measurement, the remote computing device may select an appropriate sound. For example, a fast or otherwise high-velocity drum motion may cause the remote computing device to output a relatively loud drum sound, while a slow or otherwise low-velocity drum motion may cause the remote computing device to output a relatively quiet drum sound.

Thus the wearable sensor system may detect and quantify a wide range of gestures/motions and a horizontal region associated with same in order to provide enhanced gesture/motion recognition. The wearable sensor system may be housed in a relatively small housing and thus be generally unobtrusive to a user and invisible or otherwise inconspicuous to those observing the user. In addition, and in a general sense, a user is free to "move about" while performing hand/body movements as their personal magnetic field travels with them. Numerous other example embodiments and permutations will be apparent in light of this disclosure, and the provided music-centric examples are not intended to limiting.

Example Wearable Sensor System and Operation

Various embodiments disclosed herein are directed to a wearable sensor system including a sensor arrangement configured to detect user-motion and provide a representation of the same to a remote computing system. Now turning to the figures, FIG. 1A illustrates one such example wearable sensor system 100 in accordance with an embodiment of the present disclosure. As shown, the wearable sensor system 100 includes a housing 101, a power supply 102, a controller 104, a sensor arrangement 107, a wireless transceiver circuit 108, an antenna device 110, and first and second magnet devices 116-1 and 116-2. As should be appreciated, FIG. 1A depicts the wearable sensor system 100 in a highly simplified form and that different variations and permutations are also within the scope of the present disclosure.

The housing 101 may comprise various physical form factors and styles including, for example, materials that provide suitable protection of circuits and other components disposed within. For example, the housing 101 may comprise a small form-factor (SFF) housing. In some specific example cases, the housing 101 comprises a wristband or other wearable such as a palm-worn, a leg-worn, or a foot-worn housing. The power supply 102 may comprise, for example, one or more power sources capable of providing suitable power ($V_{cc}$) to various components of the wearable sensor system 100. For example, the power supply 102 may include one or more batteries and associated circuitry configured to provide direct current (DC).

The controller 104 may comprise, for example, a Complex Instruction Set Computer (CISC), a field-programmable gate array (FPGA), Reduced Instruction Set Computer (RISC) processor, x86 instruction set processor, multi-core, microcontroller, an application-specific integrated circuit (ASIC), or central processing unit (CPU). In some embodiments, the controller 104 may comprise dual-core processor(s), dual-core mobile processor(s), and so on. The controller 104 can include storage (not shown) such as non-volatile storage devices including flash memory and/or volatile storage devices such as Random Access Memory (RAM), Dynamic Random Access Memory (DRAM), and Static Ram (SRAM). The controller 104 may include or otherwise receive instructions that when executed cause one or more processes to be carried out, such as the method 400 described below with respect to FIG. 4. In any event, the processes may be implemented, for example, using software (e.g., C or C++ executing on the controller/processor), hardware (e.g., hardcoded gate level logic or purpose-built silicon) or firmware (e.g., embedded routines executing on a microcontroller), or any combination thereof.

The sensor arrangement 107 includes a magnetic sensing device 106, an gyroscope 112, and an accelerometer 113. Thus in cases where the sensor arrangement 107 includes each of the aforementioned sensors, the sensor arrangement 107 may be accurately referred to as an accelerometer, gyroscope, and magnetometer (AGM) sensor arrangement. In an embodiment, one or more sensors of the sensor arrangement 107 are co-located in a single chip package.

In an embodiment, the magnetic sensing device 106 may provide a voltage proportional to an applied magnetic field and also sense a direction of the same. The magnetic sensing device 106 may provide a digital representation of the voltage to the controller 104, for example. The magnetic sensing device 106 may comprise a dual-axis or a tri-axis magnetometer device. Non-limiting examples of magnetic sensing devices suitable for use in various embodiments disclosed herein include a solid-state Hall Effect sensor, magneto-diode, magneto-transistor, anisotropic magnetoresistance (AMR) magnetometer, giant magnetoresistance (GMR) magnetometer, magnetic tunnel junction magnetometer, magneto-optical sensor, Lorentz force based Microelectromechanical systems (MEMS) sensor, Electron Tunneling based MEMS, MEMS compass.

The gyroscope 112 may comprise a tri-axis digital gyroscope or any other suitable sensor capable of sensing angular velocity and converting the same to a proportional electrical signal. The accelerometer 113 may comprise a tri-axis accelerometer, or any other suitable sensor configured to measure acceleration forces and converting the same into a proportional electrical signal.

A user 118 may wear or otherwise attach the wearable sensor system 100 to their person. For example, the user 118 may wear an armband which houses at least a portion of the wearable sensor system 100. Other body positions are also within the scope of this disclosure such as, for example, a palm, a leg, a foot, or any other location a user may move for the purpose of causing that movement to be detected, quantified and translated into an action.

The user 118 may further wear or otherwise attach magnet devices 116-1 and 116-2 to a location on their person. For example, the user 118 may wear a belt 119 with the magnet devices 116-1 and 116-2 integrated into the belt 119 or otherwise attached thereto (e.g., using a clip). As discussed further below, the magnet devices 116-1 and 116-2 may be disposed generally opposite one another such that they are positioned about 180 degrees from each other. In addition, the magnet devices 116-1 and 116-2 may be arranged with an opposite field direction. For example, and as shown, the magnet devices 116-1 and 116-2 may generate magnetic fields 114-1 and 114-2, respectively, which are illustrated having opposite field directions. The generated magnetic fields 114-1 and 114-2 each provide a magnetic field greater than that of the Earth's magnetic field, thus allowing the wearable sensor system 100 to perform various horizontal location schemes disclosed herein. For example, the Earth's magnetic field is between 25 to 65 microTesla. Thus the magnet devices 116-1 and 116-2 may be configured with a nominal magnetic strength that is at least 2× that of the Earth's magnetic field. To this end, the magnet devices 116-1 and 116-2 may be configured with a nominal strength that exceeds 65 microTesla. Some specific example strengths include 2×, 3×, 5×, 10×, 20×, 30× the Earth's magnetic field. The particular strength chosen is not particularly relevant to the present disclosure so long as the wearable sensor system has a field strength that exceeds the Earth's magnetic field and is suitable for performing horizontal localization as disclosed herein.

In some cases, the magnet devices 116-1 and 116-2 may comprise permanent magnets. For example, the magnet devices 116-1 and 116-2 may be made of ferromagnetic materials including, for instance, iron, nickel, cobalt, or alloys thereof. In other cases, the magnet devices 116-1 and 116-2 comprise electromagnets with one or more coils of wire that magnetize when an electric current is provided. As should be appreciated in light of this disclosure, other magnet devices and magnet materials are within the scope of this disclosure.

The wireless transceiver circuit 108 may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the wireless transceiver circuit 108 may operate in accordance with one or more applicable standards in any version. To this end, the wireless transceiver circuit 108 may include, for instance, hardware, circuits, software, or any combination thereof that allows communication with external computer systems.

In some specific non-limiting examples, the wireless transceiver circuit 108 comports with the IEEE 802.11 (e.g., Wifi), Bluetooth, low-energy Bluetooth (BLE), ZigBee, near-field communication, or any other suitable wireless communication standard. In addition, the wireless transceiver circuit 108 may comport with cellular standards such as 3G (e.g., EV-DO, W-CDMA) and 4G wireless standards (e.g., HSPA+, WIMAX, LTE).

In use, the magnetic sensing device 106 may measure various characteristics of adjacent magnetic fields such as, for instance, magnetic force (M) in microTesla (μT) and field direction (D). The magnetic sensing device 106 may output a representation of the measured magnetic force M and the direction D to the controller 104. In turn, the controller 104 may receive the representation of the magnetic force M and the field direction D, and use the same to identify a horizontal region of the wearable sensor system relative to the user 118. For instance, and as shown, a wrist of the user 118 having the wearable sensor system 100 attached thereto may register a particularly strong magnetic force (or intensity) M and a first direction D biased substantially by the magnetic field 114-1 when in close proximity to the magnet device 116-1, and more particularly, to one of the poles of the magnet device 116-1. Conversely, when moved to a center position between the magnetic devices 116-1 and 116-2, the wearable sensor system 100 may measure a different magnetic force such as a medium magnetic force and a second direction D. As discussed further below, the medium magnetic force and second direction D may be the result of the center position generally corresponding to a third magnetic field 114-3 (FIG. 3A) that is introduced based on the opposite poles of the first and second magnet device being attracted to and reinforcing one another.

In any event, the wearable sensor system 100 may use a measured magnetic force alone or in combination with a measured field direction, and may advantageously use additional data output from other sensors of the sensor arrangement 107 to determine and quantify gestures/movements. For example, the controller 104 may fuse or otherwise use in combination the output of the magnetic sensing device 106 with data output via the gyroscope 112 or accelerometer 113, or both. This fusion of data may allow the controller 104 to filter/stabilize data output by the sensor arrangement 107 to make more precise or otherwise accurate horizontal region identifications. Alternatively, or in addition to fusing sensor data, the controller 104 may utilize data output by the gyroscope 112 or the accelerometer 113, or both, to determine interrupt signals. For example, the controller 104 may detect acceleration/velocity that exceeds a predefined threshold such as when a user quickly moves a hand, or other part of their body. The controller 104 may then use the detected acceleration/velocity as an interrupt signal that causes the controller 104 to receive and analyze additional measurements, such as magnetic measurements from the magnetic sensing device 106. Thus the controller 104 may utilize data output by the gyroscope 112 and/or the accelerometer 113 as a relatively low-power method of triggering additional relatively higher-power measurements and processing.

Figure 1B:
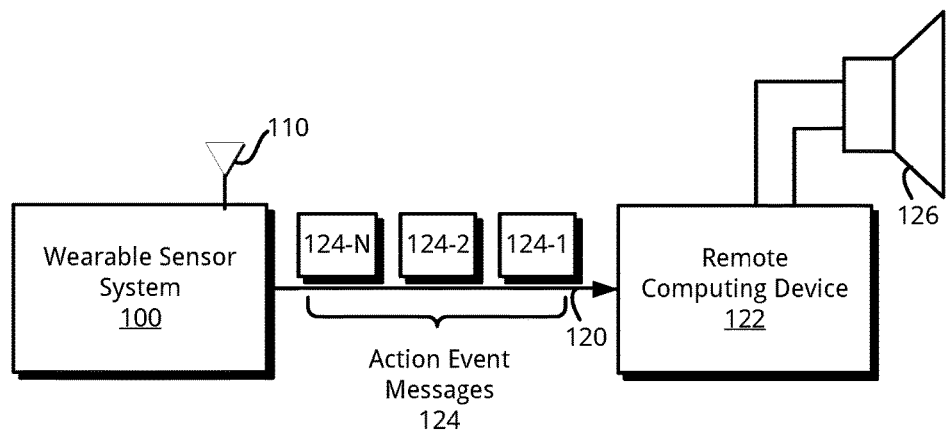
FIG. 1B illustrates the example wearable sensor system of FIG. 1A configured to communicate via a wireless link with a remote computing device, in accordance with an embodiment of the present disclosure.

Now referring to FIG. 1B, with additional reference to FIG. 1A, a block diagram illustrates the example wearable sensor system 100 configured to wirelessly communicate with a remote computing device 122, in accordance with an embodiment of the present disclosure. In an embodiment, the remote computing device 122 may comprise the computing device 600 of FIG. 6. As shown, the remote computing device 122 may be coupled to a speaker device 126 configured to output sound. The remote computing device 122 may include or otherwise receive instructions that when executed cause one or more processes to be carried out, such as the method 500 described below with respect to FIG. 5.

The wearable sensor system 100, and more particularly the controller 104, may generate a plurality of action event messages collectively shown as 124, and individually shown as 124-1 to 124-N, in response to identifying at least one of a horizontal region change or a movement of the wearable sensor system 100. Some such example movements may be based on output data from at least one of the gyroscope 112 or the accelerometer 113 that indicates motion, or a lack thereof, as the case may be. For instance, if the user 118 moves their hand to beat an invisible drum, the motion from the downward acceleration and the upward acceleration may cause the wearable sensor system 100 to generate corresponding action event messages. Likewise, a momentary pause to hit the invisible drum may also cause the wearable sensor system 100 to generate a corresponding action event message. In this particular example, the particular drum to simulate (e.g., a right bongo or a left bongo) may be identified based on a horizontal region identified by the wearable sensor system 100. Thus the wearable sensor system 100 may output a sequence of action events 124 to a remote computing device, with that sequence representing a desired action or set of actions.

As should be appreciated, a user may continually perform one or more movements over a period time, and thus, the wearable sensor system 100 may send a stream of corresponding action event messages 124 to the remote computing device 122. Thus the frequency and rate of the stream of corresponding action event messages 124 may vary relative to the occurrence of movement, and the particular identified horizontal region of that movement.

In turn, and in accordance with an embodiment, the remote computing device 122 may receive and process each action event message, and in response thereto, output a musical note or other sound. The sequence of action event messages 124 may form or otherwise represent a recognizable pattern that may correspond to a predefined action (e.g., a drum hit, a piano key press). For instance, certain actions may cause the remote computing device 122 to output a synthesized musical note/sound. In addition, certain other actions may prompt the remote computing device 122 to output a prerecorded sound or musical track. The prerecorded sounds and musical tracks may be stored locally in a memory of the remote computing device 122 (not shown), or may be retrieved from a remote storage location.

Other actions are also within the scope of this disclosure, and the provided examples are not intended to be limiting. For example, each action event may correspond to non-sound related actions. For example, the remote computing device 122 may use the received action event messages 124 to control one or more lighting controllers.

Figure 2A:
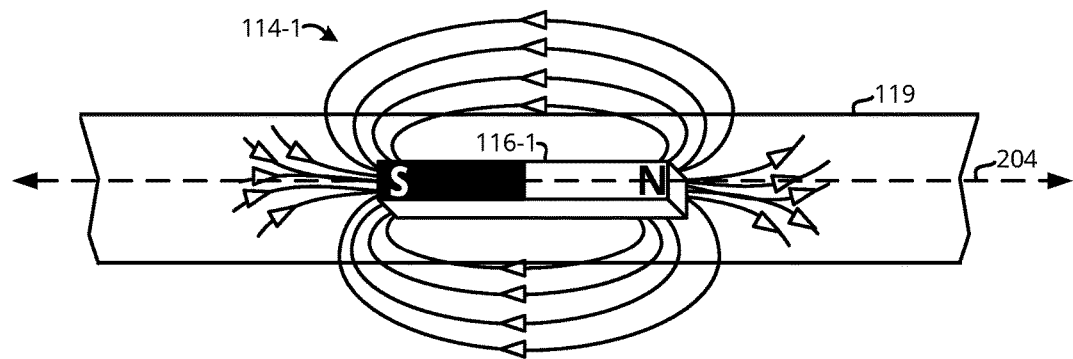
FIG. 2A show an example magnet device configured to generate a magnetic field, in accordance with an embodiment of the present disclosure.
Figure 2B:
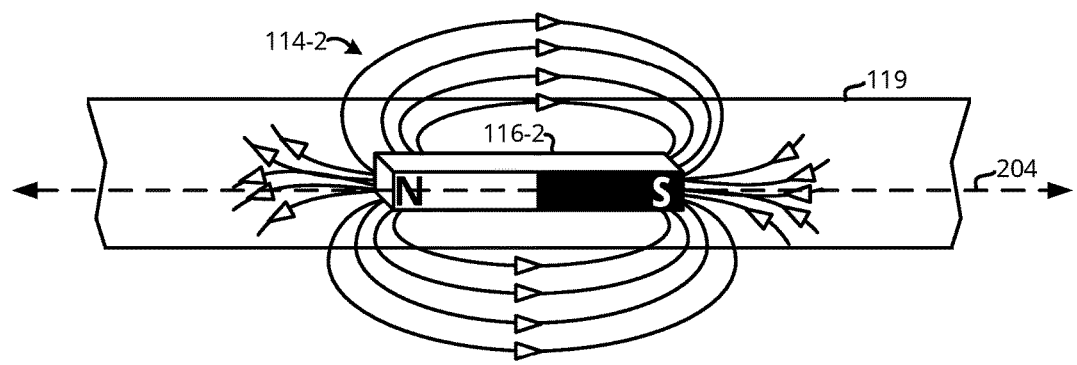
FIG. 2B shows another example magnet device configured to generate a magnetic field, in accordance with an embodiment of the present disclosure.

Turning now to FIG. 2A, an example of the first magnet device 116-1 is shown fixedly attached to a first portion of a belt 119 or other wearable, in accordance with an embodiment of the present disclosure. As shown, the first magnet device 116-1 is disposed lengthwise such that each respective pole generally aligns along a horizontal axis 204. To this end, the first magnet device 116-1 provides a first magnetic field 114-1 having a first orientation. In contrast, and as shown in FIG. 2B, an example of the second magnet device 116-2 is shown fixedly attached to a second portion of the belt 119. The second magnet device 116-2 is also disposed lengthwise such that each respective pole generally aligns along the horizontal axis 204. To this end, the magnet device 116-2 provides a second magnetic field 114-2 having a second orientation. The first and second orientations of the first and second magnet device 116-1 and 116-2, respectively, may result in a magnetic attraction between opposite poles of each of the magnet devices 116-1 and 116-2. This magnetic attraction may result in a third magnetic field 114-3 (FIG. 3A) being introduced about the user 118. Thus, a plurality of predictable magnetic field lines may be introduced about a user, and may be measured by the magnetic sensing device 106 and used to identify a particular horizontal region of the same.

In an embodiment, the first magnet device 116-1 may be secured to an article of clothing (e.g., belt 119) about a first region thereof, with the first magnet device 116-1 being configured to provide a first magnetic field 114-1 having a first field strength. A second magnet device 116-2 may be configured to provide a second magnetic field 114-2 having a second field strength, with the second magnet device 116-2 secured to the article of clothing about a second region generally opposite to the first region such that an orientation of the second magnetic field 114-2 is generally opposite to an orientation of the first magnetic field 114-1 when the article of clothing is worn by a user. A sensor arrangement 107 including a magnetic sensing device 106 may include circuitry configured to receive a signal representing a measured magnetic field strength M and a field direction D from the magnetic sensing device 106 and identify a horizontal region of the magnetic sensing device based at least in part on the measured magnetic field strength M.

Figure 2C:
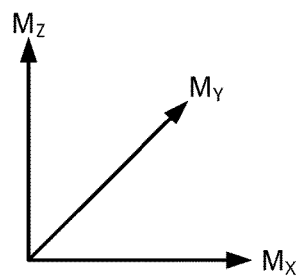
FIG. 2C illustrates a vector quantity M that defines a magnetic field based on three directional components in a Cartesian coordinate system, in accordance with an embodiment of the present disclosure.

Referring to FIG. 2C, a magnetic field may be defined by vector quantities characterized by both field strength and field direction. For example, a magnetic field may be represented by a vector M having three directional components X, Y, and Z in a Cartesian coordinate system, such as shown. The measured values of the $M_X$ and $M_Y$ component may vary relative to the strength of a given magnetic field and the physical orientation of a magnetic sensing device within the given magnetic field. For example, some sensors such as Hall Effect sensors operate on the principle that when a current carrying conductor is placed in a magnetic field, a voltage will be generated perpendicular to the direction of the field and the flow of current. When a generally perpendicular magnetic field is present, current flow may be distorted. This uneven distribution of electron density creates a measurable difference, which may be represented by a proportional output voltage. This voltage is generally called the Hall voltage. When the input current is held constant, the Hall voltage will be directly proportional to the strength of the magnetic field. In addition, some sensors, like Hall Effect sensors, are polarity-dependent. That is, if the magnetic field changes direction, the polarity of the Hall voltage flips (e.g., from positive to negative and vice-versa). This polarity-dependence allows some devices to determine, for example, a direction of north based on the Earth's magnetic lines of flux.

Thus, the magnetic sensing device 106 may output positive or negative $M_X/M_Y$ component depending on the particular orientation of the magnetic sensing device 106 in 3-dimensional space relative to a given magnetic field, and the direction of field lines associated with the given field. For example, the magnetic sensing device 106 may comprise a Hall Effect sensor, and thus the magnetic sensing device 106 may output $M_X$ and $M_Y$ components derived from a Hall voltage that indicates field strength sensed along an X and Y axis, and a direction D for a given magnetic field (e.g., based on the sign of the $M_X/M_Y$ components). Embodiments disclosed herein may specifically reference the $M_X$ component alone, although as should be appreciated in light of this disclosure either the $M_X$ or $M_Y$ components may be used to determine a direction D for a given magnetic field.

Some embodiments disclosed herein may utilize a measured field strength at least in part to determine a horizontal region of the magnetic sensing device 106. In an embodiment, a total absolute strength (intensity) may be calculated based on the measured directional components $M_X$, $M_Y$ and $M_Z$ using the following equation:

$$|M|=\sqrt{MX^2+MY^2+MZ^2} \qquad \text{Equation (1)}$$

Figure 3A:
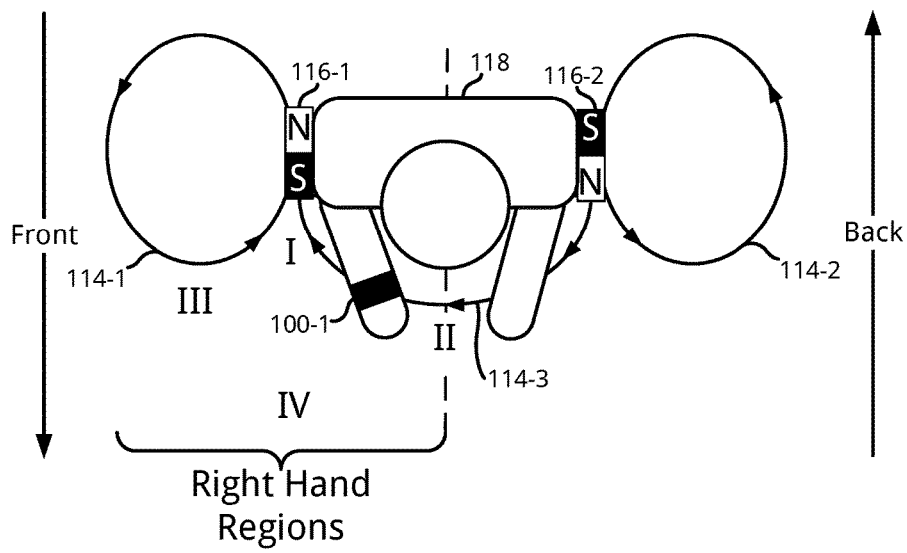
FIG. 3A shows an example plan view illustrating a plurality of detectable right-hand horizontal regions relative to a plurality of magnetic fields disposed about a user, in accordance with an embodiment of the present disclosure.

Now referring to FIG. 3A, a top-down plan view illustrates the user 118 wearing a wearable sensor system 100-1 on a right hand, and a plurality of identifiable right-hand horizontal regions detectable by the same (e.g., I, II, III, IV), in accordance with an embodiment of the present disclosure. As shown, the user 118 has first and second magnet devices 116-1 and 116-2 generating magnetic fields 114-1 and 114-2, respectively. The first and second magnet devices 116-1 and 116-2 may be generally co-planar with each other and may be configured in a physical front-to-back orientation whereby each magnet device extends length-wise along a right and left side of the user 118, respectively. In addition, each of the magnet devices 116-1 and 116-2 may include opposite poles pointing forward and back from the user 118. The front-back orientation may cause a third magnetic field 114-3 to be introduced towards the front of the user 118 based on the attraction between the opposite poles of the first magnet device 116-1 and the second magnet device 116-2.

Detection of each right-hand horizontal region (e.g., I, II, III and IV) by the wearable sensor system 100-1 will now be discussed in turn. Since region I is nearest to one of the poles of the first magnet device 116-1, the wearable sensor system 100-1 may measure an absolute intensity (|M|) at a first level, wherein the first level is relatively high compared to the Earth's magnetic field (or reference field). In some cases, region I may include a measured absolute intensity at about 10-20 times that of Earth's magnetic field, depending on the configuration of the magnet device 116-1. Thus the wearable sensor system 100-1 may identify region I as the horizontal region based on identifying the measured absolute intensity value falls within a range of values associated with region I. The range of values may be stored in a lookup table or other suitable location in a memory of the wearable sensor system 100-1.

On the other hand, region II is further away from the poles of the first magnet device 116-1 as compared to region I, but relatively close to the torso of the user 118, thus resulting in the wearable sensor system 100-1 measuring a "medium" absolute intensity. The medium absolute intensity may include a measured magnetic intensity value at about 5-6 times that of the Earth's magnetic field. However, unlike region I discussed above, a measured medium absolute intensity alone may not necessarily allow the wearable sensor system 100-1 to identify the region as region II. This is because region III is relatively the same distance away from the poles of the magnet device 116-1 as region II. For this reason, measurements within region III may also potentially result in a measured medium absolute intensity. Thus the wearable sensor system 100-1 may use the $M_X$ component to distinguish the two otherwise generally ambiguous regions II and III from one another. For example, the field 114-3 may be understood to produce a negative $M_X$ component based on the wearable sensor system 100-1 disposed in proximity with the magnetic field 114-3, and measuring the direction D of the field lines of the same. On the other hand, the magnetic field 114-1 may be understood to produce a positive $M_X$ component based on the wearable sensor system 100-1 disposed in proximity with the magnetic field 114-1 and measuring the direction D of the field lines of the same.

Figure 3B:
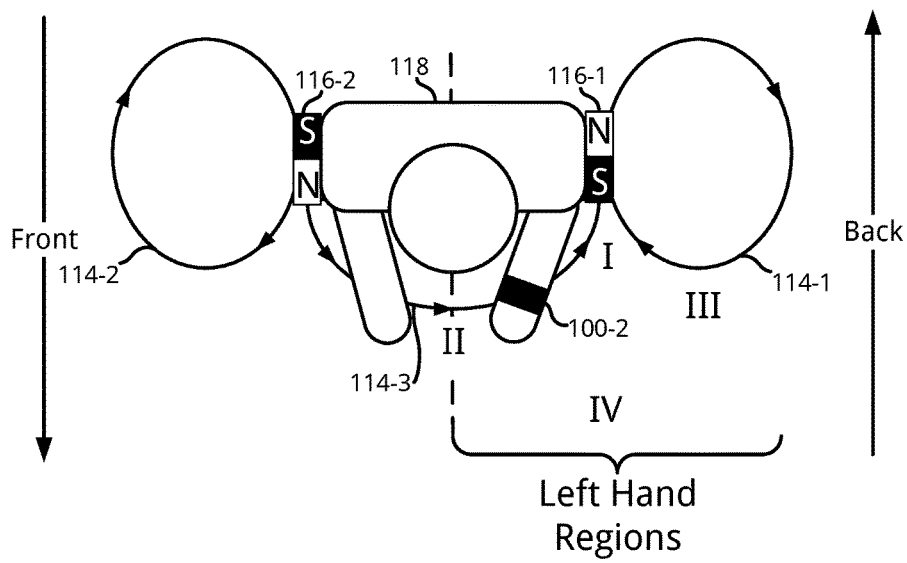
FIG. 3B shows another example plan view illustrating a plurality of detectable left-hand horizontal regions relative to a plurality of magnetic fields disposed about a user, in accordance with an embodiment of the present disclosure.
Figure 3C:
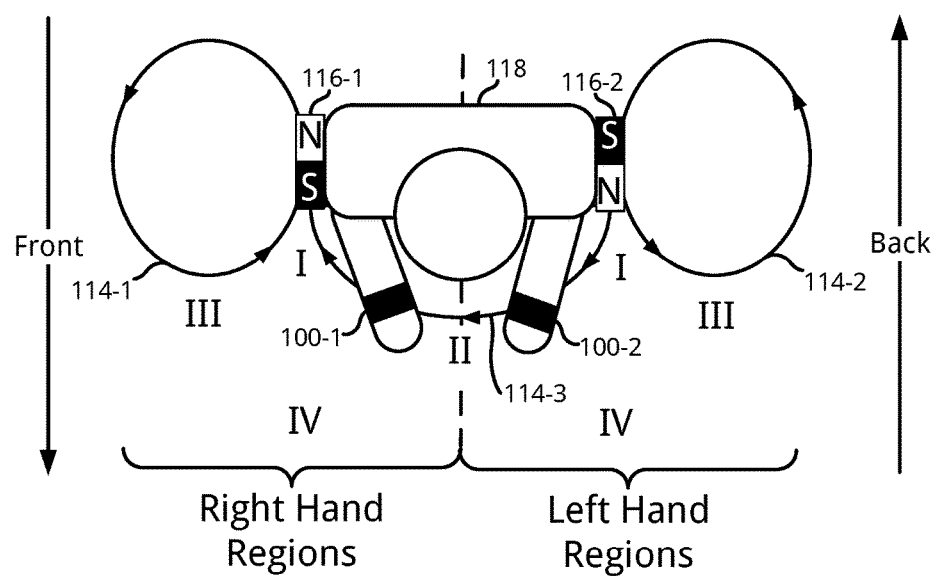
FIG. 3C shows another example plan view illustrating a plurality of wearable sensor systems worn by a user, and a plurality of detectable horizontal regions relative to a plurality of magnetic fields disposed about the user, in accordance with an embodiment of the present disclosure.
Figure 3D:
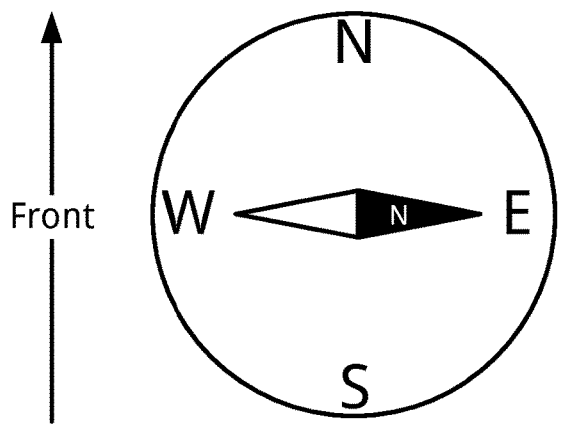
FIG. 3D shows an example magnetic compass disposed within a first detectable horizontal region relative to a magnetic field of FIG. 3A, in accordance with an embodiment of the present disclosure.
Figure 3E:
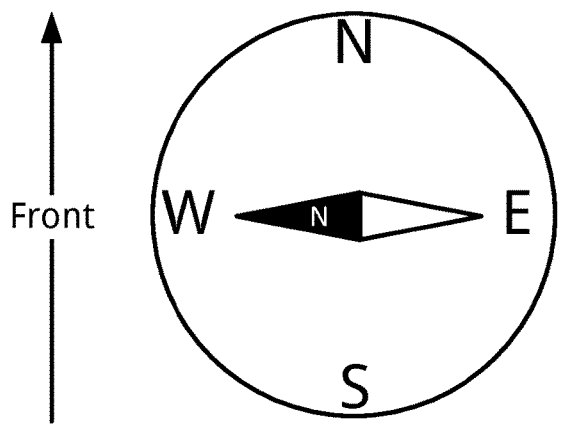
FIG. 3E shows an example magnetic compass disposed within a second detectable horizontal region relative to a magnetic field of FIG. 3A, in accordance with an embodiment of the present disclosure.

Some aspects of field direction relative to the $M_X$ component may better be understood by way of illustration. Referring to FIG. 3D with additional reference to FIG. 3A, a magnetic compass is shown disposed in region II, in accordance with an embodiment of the present disclosure. As shown, the magnetic compass is disposed generally co-planar with the magnet device 116-1 and oriented such that north is facing forward. As a result of the field direction of the third magnetic field 114-3 formed between opposite poles of the magnet devices 116-1 and 116-2, the north pole of the magnetic compass generally points to the east based on an attraction to the south pole of the first magnet device 116-1. This direction may be understood to correlate to a negative $M_X$ component. Conversely, and as shown in FIG. 3E, the magnetic compass is disposed in region III with north facing forward, in an embodiment of the present disclosure. In this example, the direction of the magnetic field 114-1 causes the north pole of the magnetic compass to point generally to the west based on an attraction with the south pole of the first magnet device 116-1. This direction may be understood to correlate to a positive $M_X$ component.

Thus, and in accordance with an embodiment, the wearable sensor system 100-1 may use the measured field strength and the direction D to distinguish between regions II and III. For example, the wearable sensor system 100-1 may identify that a measured absolute intensity falls within a range of values corresponding to a medium absolute intensity for both regions II and III using, for instance, a lookup table. In response, the wearable sensor system 100-1 may then compare a measured direction D to a predefined direction D associated with each of regions II and III to find a match. Thus the measured direction D may advantageously allow the wearable sensor system 100-1 to distinguish between otherwise ambiguous horizontal regions.

Since region IV is the furthest region from the poles of the first magnet device 116-1, measurements within this region result in a low absolute intensity (e.g., 2-3 times that of the Earth's magnetic field). Thus the wearable sensor system 100-1 may identify region IV as the horizontal region based on identifying the measured absolute intensity value falls within a range of values associated with region I. The range of values may be stored in a lookup table or other suitable location in a memory of the wearable sensor system 100-1.

In an embodiment, left-hand horizontal regions may also be detected by a wearable sensor system 100-2 worn by the user 118. For example, as shown in FIG. 3B, a top-down plan view illustrates the user 118 wearing a wearable sensor system 100-2 on the left hand, and a plurality of identifiable left-hand horizontal regions detectable by the same (e.g., I, II, III, IV), in accordance with an embodiment of the present disclosure. As should be appreciated, the orientation of the first and second magnet devices 116-1 and 116-2 are the opposite to that of the orientation shown in FIG. 3A. As should be appreciated, this allows region II and III to have an opposite field direction, thus allowing regions II and III to be distinguished from one another when the wearable sensor system 100-2 is worn on a left hand.

In any event, the wearable sensor system 100-2 may detect each left-hand region in a manner substantially similar to that of the right-hand regions discussed above. For example, the wearable sensor system 100-2 may measure a field strength value and use the same to determine a corresponding horizontal region. In particular, the wearable sensor system may use the field strength to calculate an absolute intensity |M|, using Equation (1) for example, and then compare the absolute intensity |M| to plurality of predefined ranges that correspond to each left-hand horizontal region. As previously discussed, some regions may cause a substantially similar field strength measurement to occur. For example, left-hand regions II and III may each cause a medium intensity value to be measured by the magnetic sensing device 106. In these cases the wearable sensor system 100-2 may also use a measured direction D to distinguish between horizontal regions.

An embodiment disclosed herein includes a lookup table that correlates horizontal regions with a range of absolute intensity values and, optionally, a predefined field direction D. Table 1 provides one example table suitable for use in various localization processes disclosed herein.

TABLE 1

Horizontal Regions

| Horizontal Region Identifier | Absolute Intensity ($|M|$) | Field Direction (D) |
|---|---|---|
| I | High $|M|$ (e.g., 10-20x reference field) | N/A |
| II | Medium $|M|$ (e.g., 5-6x reference field) | Negative $M_X$ |
| III | Medium $|M|$ (e.g., 5-6x reference field) | Positive $M_X$ |
| IV | Low $|M|$ (e.g., 2-3x, reference field) | N/A |

As should be appreciated, the user 118 may wear a plurality of wearable sensor systems, such as the wearable sensor system 100-1 and 100-2 on their right and left hand, respectively. FIG. 3C illustrates one such example, and illustrates a top-down view in accordance with an embodiment of the present disclosure. Thus the user may advantageously utilize both wearable sensor systems 100-1 and 100-2 simultaneously during, for example, a musical performance. Each of the wearable sensor systems 100-1 and 100-2 may control a same remote computing device, or different remote computing devices.

As should be appreciated in light of this disclosure, virtually any magnet strength for the magnet devices 116-1 and 116-2 may be chosen so long as the magnetic field provides a magnetic field that exceeds the Earth's magnetic field strength and allows different horizontal regions to be identified based on measurements by the wearable sensor system 100. To this end, the first and second magnet devices 116-1 and 116-2 may be configured with various strengths depending on a desired configuration, and the specific strengths (e.g., 10-20×, 5-6×, 2-3×) disclosed herein should not be construed as limiting the present disclosure.

Example Methods and Architecture

Figure 4:
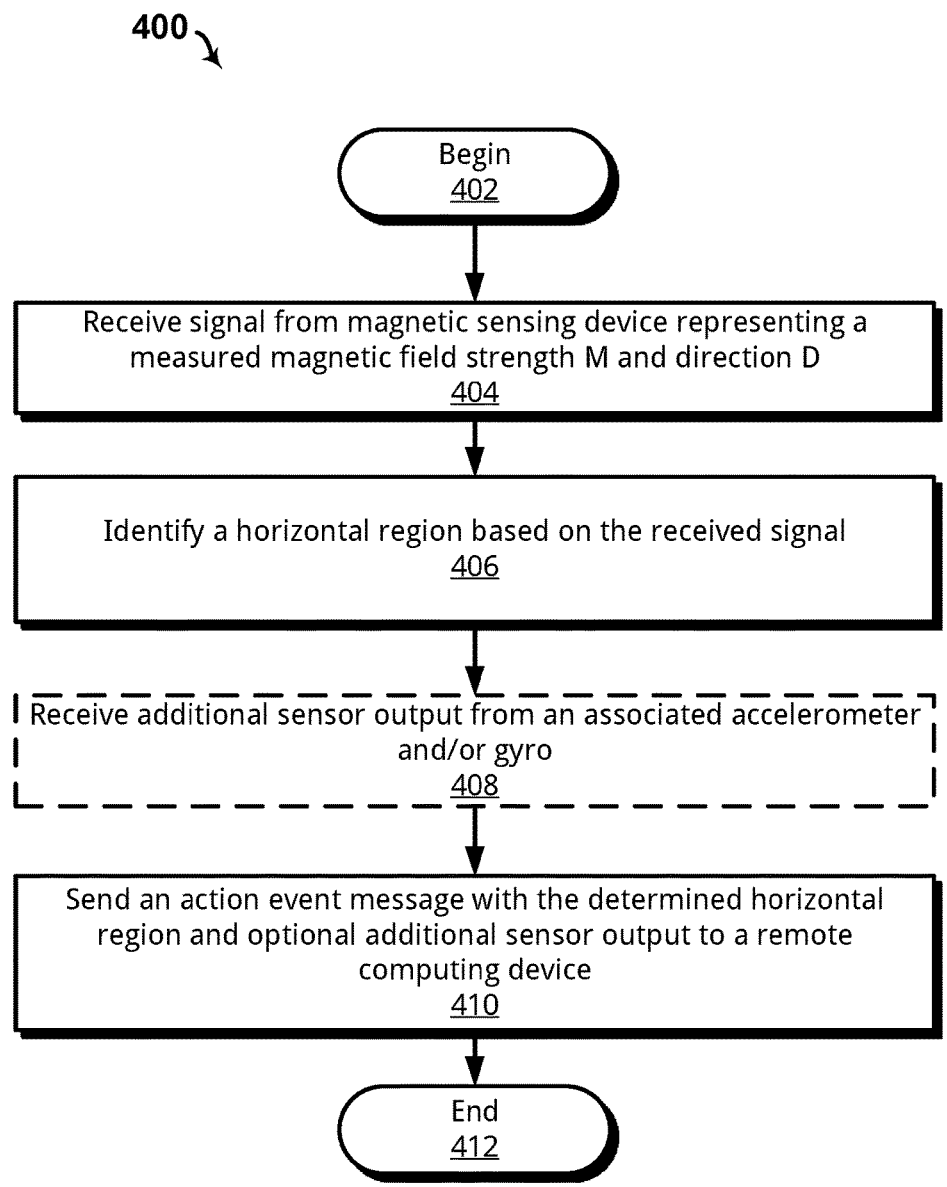
FIG. 4 shows an example method for identifying a particular horizontal region of a wearable sensor system based at least in part on a measured magnetic force/strength of a magnetic field adjacent a user, in accordance with an example embodiment of the present disclosure.

As previously discussed, various embodiments disclosed herein include a wearable sensor system configured to identify a particular horizontal region of the same relative to predictable magnetic fields disposed around a user. FIG. 4 shows one such example method 400, and may be performed by the controller 104. However, as should be appreciated, various acts may be performed by multiple controllers and by multiple different controller types. Acts may not necessarily be performed in the particular order shown in FIG. 4. Method 400 begins in act 402.

In act 404, the controller 104 receives a signal from the magnetic sensing device 106. The signal may represent an absolute intensity $|M|$ of a measured magnetic field, and a direction D for the same (e.g., a positive or negative $M_X$ component). In some cases, the controller 104 calculates the absolute intensity $|M|$ based on Equation (1), as discussed above.

In act 406, the controller 104 may identify a horizontal region based on the signal received in act 404 using one or more tables, such as Table 1. The one or more tables may be stored in a memory of the controller 104, or otherwise be accessible thereby. In a general sense, the one or more tables may provide a lookup whereby a calculated/received absolute intensity may be compared to a plurality of magnetic field strength ranges. Each of the plurality of magnetic field strength ranges corresponds with an identifier of a horizontal region. This comparison may further include matching the direction D for the measured magnetic field with a predefined direction associated at least one horizontal region identifier. As previously discussed, regions (e.g., regions II and III) may be ambiguous based on each causing a generally medium absolute intensity value to be calculated by the wearable sensor system 100.

In act 408, the controller 104 may receive additional sensor data output by the gyroscope 112 or accelerometer 113, or both. Recall that the controller 104 may fuse this additional data to stabilize or otherwise increase accuracy of the horizontal positional identification in act 406. The controller 104 may utilize the additional data to also determine a vertical location, for example.

In act 410, the controller 104 sends an action event message with the horizontal region identified in act 406 to a remote computing device, such as the remote computing device 122. In some cases, the action event message also includes an indication of acceleration (velocity), and yaw/tilt provided by the accelerometer 113 and gyroscope 112, respectively, in act 408. The controller 104 may send the action event message to the remote computing device 122 via the wireless transceiver circuit 108, or via other suitable communication link. The method 400 ends in act 412.

Figure 5:
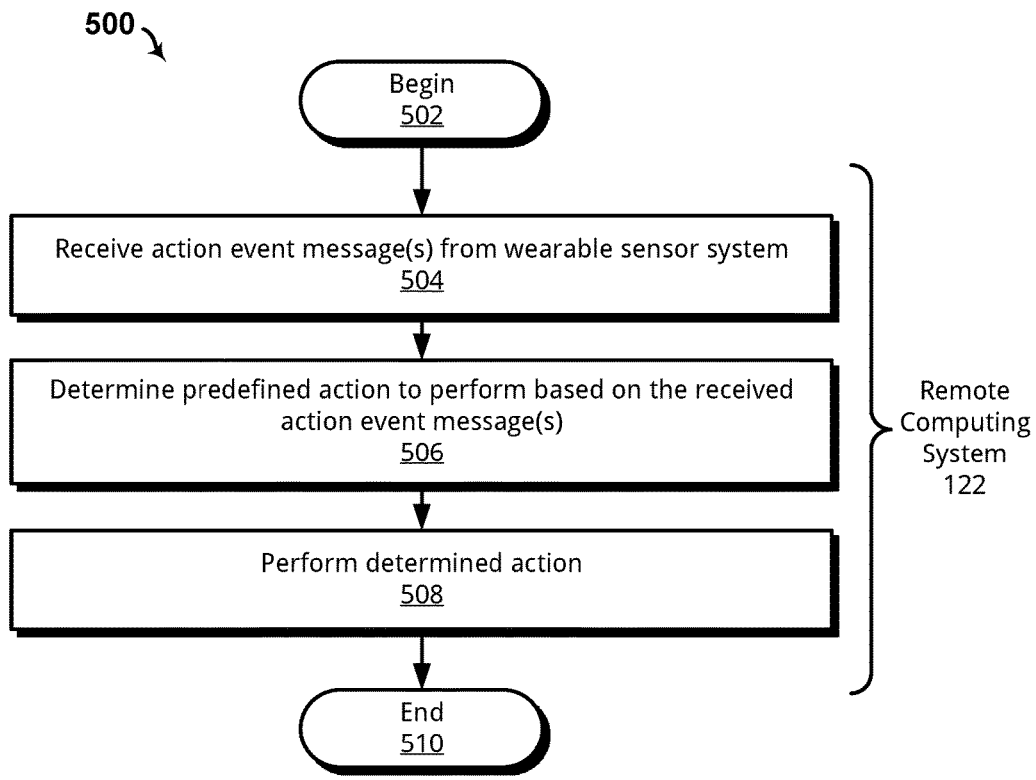
FIG. 5 shows an example method for receiving an action event message from the wearable sensor system of FIG. 1A and using the same to output a musical note or sound, in accordance with an embodiment of the present disclosure.

Turning to FIG. 5, an example method 500 for receiving one or more action event messages from the wearable sensor system 100 of FIG. 1A is shown, in accordance with an embodiment of the present disclosure. The method 500 may be performed by a remote computing device, such as the remote computing device 122. Method 500 begins in act 502.

In act 504, the remote computing device 122 receives one or more action event messages, such as the action event messages 124 (FIG. 1B), from the wearable sensor system 100. The one or more action event messages 124 may be received via, for example, a wireless communication link provided by a wireless transceiver circuit of the remote computing device 122.

In act 506, the remote computing device 122 determines a predefined action to perform based on the one or more received event messages 124. In an embodiment, the remote computing device 122 determines the predefined action by analyzing an identified horizontal region value within the one or more received event messages 124 alone or in combination with gyroscope output (e.g. yaw, roll, pitch) and/or accelerometer data (e.g., acceleration).

In act 508, the remote computing device 122 performs the particular action determined in act 506. In some cases, this includes the remote computing device 122 determining a particular sound to output via a speaker. In these cases, the sound may be pre-recorded or synthesized. However, numerous other non-audible actions may be performed and are also within the scope of this disclosure. For example, the remote computing device 122 may adjust a lighting controller based on the one or more action event messages received 124 in act 504. The method 500 ends in act 510.

Example System

Figure 6:
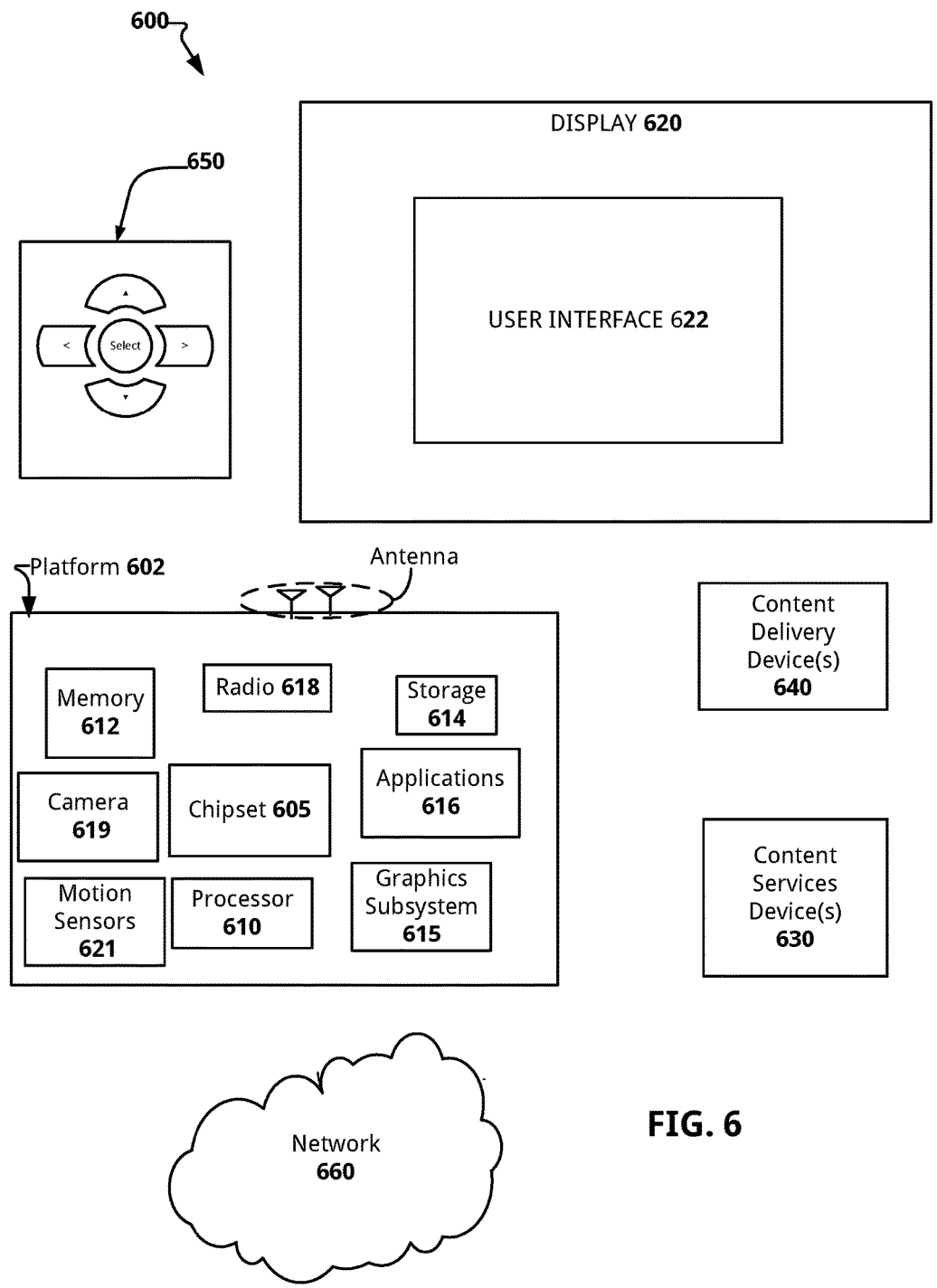
FIG. 6 illustrates a computer system configured to perform various processes disclosed herein, in accordance with an example embodiment of the present disclosure.

FIG. 6 illustrates a computing system 600 configured to perform various processes disclosed herein. For example, system 600 may be incorporated into a personal computer (PC), laptop computer, wearable computing device, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620, so as to supplement navigational gesturing by the user. Each of these example components is described in more detail below.

In some embodiments, platform 602 may comprise any combination of a chipset 605, processor 610, memory 612, storage 614, graphics subsystem 615, camera 619, motion sensors 621, applications 616 and/or radio 616 or wireless transceiver circuit. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display, and in some embodiments is configured to synthesize face images, as variously described herein. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chipset 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 6.

Figure 7:
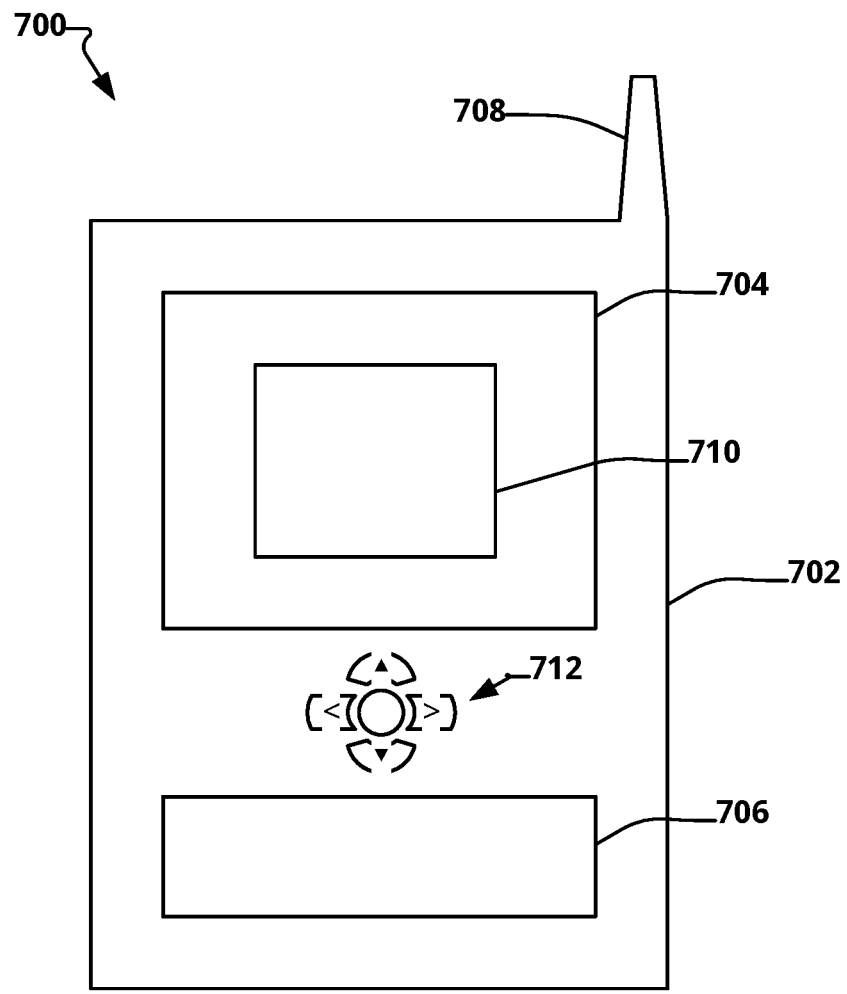
FIG. 7 shows a mobile computing system configured in accordance with an embodiment of the present disclosure.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, mobile electronic device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device, which in one example embodiment is a touchpad display. I/O device 706 may comprise any suitable I/O device for entering information into a mobile computing device. Examples for I/O device 706 may include an alphanumeric keyboard, a numeric keypad, a touch pad, input keys, buttons, a camera, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

FURTHER EXAMPLE EMBODIMENTS

The following examples pertain to further embodiments, from which numerous permutations and configurations will be apparent.

Example 1 discloses wearable sensor system, comprising an article of clothing, a first magnet device secured to the article of clothing about a first region thereof, the first magnet device configured to provide a first magnetic field having a first field strength and a first field direction, a second magnet device configured to provide a second magnetic field having a second field strength and a second field direction, the second magnet device secured to the article of clothing about a second region generally opposite to the first region such that an orientation of the second magnetic field is generally opposite to an orientation of the first magnetic field when the article of clothing is worn by a user, a sensor arrangement including a magnetic sensing device, and circuitry configured to receive a signal representing a measured magnetic field strength M and a field direction D from the magnetic sensing device, the measured magnetic field strength M and field direction D being of the first magnetic field or a third magnetic field introduced by a magnetic attraction between the first magnet device and the second magnet device, and identify a horizontal region of the magnetic sensing device based at least in part on the measured magnetic field strength M.

Example 2 includes the subject matter of Example 1, wherein the first and second magnet devices comprise a permanent magnet or an electromagnet device.

Example 3 includes the subject matter of any one of Examples 1-2, wherein the article of clothing comprises a waist-worn article of clothing.

Example 4 includes the subject matter of Example 3, wherein the first and second magnet devices are secured about 180 degrees apart from each other on the waist-worn article of clothing.

Example 5 includes the subject matter of any one of Examples 1-4, wherein the first and second magnet devices are disposed in a front-back orientation, the front-back orientation generally aligning poles of each of the first and second magnet devices along a horizontal axis.

Example 6 includes the subject matter of Example 1-5, wherein the first and second magnet devices have a magnetic field strength at least twice that of the Earth's magnetic field.

Example 7 includes the subject matter of any one of Examples 1-6, wherein the magnetic sensing device is at least one of a dual-axis or tri-axis magnetometer device.

Example 8 includes the subject matter of any one of Examples 1-6, wherein the magnetic sensing device is a solid-state Hall Effect sensor, a magneto-diode, a magneto-transistor, a anisotropic magnetoresistance (ARM) a magnetometer, a giant magnetoresistance (GMR) magnetometer, a magnetic tunnel junction magnetometer, a magneto-optical sensor, a Lorentz force based Microelectromechanical systems (MEMS) sensor, an Electron Tunneling based MEMS, or a MEMS compass.

Example 9 includes the subject matter of any one of Examples 1-8, wherein the circuitry is further configured to calculate an absolute intensity |M| based on the measured magnetic field strength M using on the following equation: $|M| \leq \sqrt{(MX^2 + MY^2 + MZ^2)}$ wherein X, Y, and Z correspond to directional components in a Cartesian coordinate system.

Example 10 includes the subject matter of Example 9, wherein the circuitry identifies the horizontal region at least in part by comparing the calculated absolute intensity |M| to a plurality predefined absolute intensity values stored in a memory.

Example 11 includes the subject matter of Example 10, wherein the plurality of predefined absolute intensity values are stored within the memory as a lookup table, the lookup table including a plurality of horizontal region identifiers and a range of absolute intensity values corresponding to each respective horizontal region identifier.

Example 12 includes the subject matter of Example 11, wherein identifying a horizontal region of a wearable sensor device includes determining if the calculated absolute intensity value |M| is within a range of absolute intensity values corresponding to a particular horizontal region identifier.

Example 13 includes the subject matter of Example 11, wherein the lookup table further includes a predefined field direction for at least one horizontal region identifier, and wherein identifying a horizontal region of a wearable sensor device includes determining if the calculated absolute intensity value |M| is within a range of absolute intensity values corresponding to a particular horizontal region identifier, and determining the predefined field direction of the particular horizontal region identifier matches the field direction D received from the magnetic sensing device.

Example 14 includes the subject matter of any one of Examples 1-13, wherein the circuitry identifies the horizontal region based on the measured field direction D being of a positive or a negative field direction.

Example 15 includes the subject matter of any one of Examples 1-14, further comprising a wireless transceiver circuit, and wherein the circuitry is further configured to send an action event message to a remote computing device via the wireless transceiver circuit, the action event message including a representation of the identified horizontal region.

Example 16 includes the subject matter of Example 15, wherein the action event message further includes additional sensor data associated with the representation of the identified horizontal region, the additional sensor data comprising output from an accelerometer, or a gyroscope, or both.

Example 17 includes the subject matter of any one of Examples 15-16, wherein the action event message is configured to cause the remote computing device to perform a predefined action, wherein the predefined action includes at least one of outputting a synthesized musical note or a prerecorded sound.

Example 18 discloses a computer-implemented method for determining a horizontal region of a wearable sensor system, the method comprising receiving a value representing a measured magnetic field strength M, calculating an absolute intensity |M| based on the measured magnetic field strength M, identifying a horizontal region of a wearable sensor device based at least in part on the calculated absolute intensity |M|, and sending, in response to identifying the horizontal region, an action event message including the identified horizontal region to a remote computing device.

Example 19 includes the subject matter of Example 18, wherein the absolute intensity |M| is calculated using the following equation: $|M|=\sqrt{(MX^2+MY^2+MZ^2)}$ wherein X, Y, and Z correspond to directional components in a Cartesian coordinate system.

Example 20 includes the subject matter of any one of Examples 18-19, wherein identifying the horizontal region further comprises comparing the calculated absolute intensity |M| to a plurality predefined absolute intensity values stored in a memory.

Example 21 includes the subject matter of Example 20, wherein the plurality of predefined absolute intensity values are stored within the memory as a lookup table, the lookup table including a plurality of horizontal region identifiers and a range of absolute intensity values corresponding to each respective horizontal region identifier.

Example 22 includes the subject matter of Example 21, wherein identifying a horizontal region of a wearable sensor device includes determining if the calculated absolute intensity value |M| is within a range of absolute intensity values corresponding to a particular horizontal region identifier.

Example 23 includes the subject matter of Example 21, further comprising receiving a value representing a measured magnetic field direction D.

Example 24 includes the subject matter of Example 23, wherein the lookup table further includes a predefined field direction for at least one horizontal region identifier, wherein identifying a horizontal region of a wearable sensor device includes determining if the calculated absolute intensity value |M| is within a range of absolute intensity values corresponding to a particular horizontal region identifier, and determining the predefined field direction of the particular horizontal region identifier matches the measured magnetic field direction D.

Example 25 includes the subject matter of any one of Examples 18-24, further comprising receiving additional sensor data from an accelerometer or a gyroscope, or both, and wherein the action event message includes a representation of the additional sensor data.

Example 26 includes the subject matter of any one of Examples 18-25, wherein the action event message is configured to cause the remote computing device to output at least one of a synthesized musical note or a preordered sound via a speaker device.

Example 27 discloses a non-transitory computer-readable medium having a plurality of instructions encoded thereon that when executed cause a process to be carried out, the process being configured to receive a value representing a measured magnetic field strength M, calculate an absolute intensity |M| based on the measured magnetic field strength M, identify a horizontal region of a wearable sensor device based at least in part on the calculated absolute intensity |M|, and send, in response to identifying the horizontal region, an action event message including the identified horizontal region to a remote computing device.

Example 28 includes the subject matter of Example 27, wherein the absolute intensity |M| is calculated using the following equation: $|M|=\sqrt{(MX^2+MY^2+MZ^2)}$ wherein X, Y, and Z correspond to directional components in a Cartesian coordinate system.

Example 29 includes the subject matter of any one of Examples 27-28, wherein identifying the horizontal region further comprises comparing the calculated absolute intensity |M| to a plurality predefined absolute intensity values stored in a memory.

Example 30 includes the subject matter of Example 29, wherein the plurality of predefined absolute intensity values are stored within the memory as a lookup table, the lookup table including a plurality of horizontal region identifiers and a range of absolute intensity values corresponding to each respective horizontal region identifier.

Example 31 includes the subject matter of Example 30, wherein identifying a horizontal region of a wearable sensor device includes determining if the calculated absolute intensity value |M| is within a range of absolute intensity values corresponding to a particular horizontal region identifier.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A wearable sensor system, comprising:
   an article of clothing;
   a first magnet device secured to the article of clothing about a first region thereof, the first magnet device configured to provide a first magnetic field having a first field strength and a first field direction;
   a second magnet device configured to provide a second magnetic field having a second field strength and a second field direction, the second magnet device secured to the article of clothing about a second region generally opposite to the first region such that an orientation of the second magnetic field is generally opposite to an orientation of the first magnetic field when the article of clothing is worn by a user;
   wherein the first and second magnet devices have a magnetic field strength greater than that of the Earth's magnetic field;

a sensor arrangement including a magnetic sensing device; and circuitry configured to:

receive a signal representing a measured magnetic field strength M and a field direction D from the magnetic sensing device, the measured magnetic field strength M and field direction D being of the first magnetic field or a third magnetic field introduced by a magnetic attraction between the first magnet device and the second magnet device; and identify a horizontal region of the magnetic sensing device based at least in part on the measured magnetic field strength M.

2. The wearable sensor system of claim 1, wherein the article of clothing comprises a waist-worn article of clothing, and wherein the first and second magnet devices are secured about 180 degrees apart from each other on the waist-worn article of clothing.

3. The wearable sensor system of claim 1, wherein the first and second magnet devices are disposed in a front-back orientation, the front-back orientation generally aligning poles of each of the first and second magnet devices along a horizontal axis.

4. The wearable sensor system of claim 1, wherein the first and second magnet devices have a magnetic field strength at least twice that of the Earth's magnetic field.

5. The wearable sensor system of claim 1, wherein the magnetic sensing device is at least one of a dual-axis or tri-axis magnetometer device.

6. The wearable sensor system of claim 1, wherein the circuitry is further configured to calculate an absolute intensity |M| based on the measured magnetic field strength M using on the following equation:

$$|M|=\sqrt{MX^2+MY^2+MZ^2}$$

wherein X, Y, and Z correspond to directional components in a Cartesian coordinate system.

7. The wearable sensor system of claim 6, wherein the circuitry identifies the horizontal region in part by comparing the calculated absolute intensity |M| to a plurality of predefined absolute intensity values stored in a memory.

8. The wearable sensor system of claim 7, wherein the plurality of predefined absolute intensity values are stored within the memory as a lookup table, the lookup table including a plurality of horizontal region identifiers and a range of absolute intensity values corresponding to each respective horizontal region identifier.

9. The wearable sensor system of claim 8, wherein identifying a horizontal region of a wearable sensor device includes determining if the calculated absolute intensity value |M| is within a range of absolute intensity values corresponding to a particular horizontal region identifier.

10. The wearable sensor system of claim 8, wherein the lookup table further includes a predefined field direction for at least one horizontal region identifier, and wherein identifying a horizontal region of a wearable sensor device includes determining if the calculated absolute intensity value |M| is within a range of absolute intensity values corresponding to a particular horizontal region identifier, and determining the predefined field direction of the particular horizontal region identifier matches the field direction D received from the magnetic sensing device.

11. The wearable sensor system of claim 1, further comprising a wireless transceiver circuit, and wherein the circuitry is further configured to send an action event message to a remote computing device via the wireless transceiver circuit, the action event message including a representation of the identified horizontal region.

12. The wearable sensor system of claim 11, wherein the action event message is configured to cause the remote computing device to perform a predefined action, wherein the predefined action includes at least one of outputting a synthesized musical note or a prerecorded sound.

13. A computer-implemented method for determining a horizontal region of a wearable sensor system, the method comprising:

receiving a value representing a measured magnetic field strength M;

calculating an absolute intensity |M| based on the measured magnetic field strength M;

identifying a first horizontal region of a wearable sensor device in response to the calculated absolute intensity |M| corresponding with a first magnetic field;

identifying a second horizontal region of a wearable sensor device in response to the calculated absolute intensity |M| corresponding with a second magnetic field; and sending, in response to identifying the horizontal region, an action event message including the first or second identified horizontal region to a remote computing device wherein the first and second magnetic fields have a field strength greater than that of the Earth's magnetic field.

14. The method of claim 13, wherein the absolute intensity |M| is calculated using the following equation:

$$|M|=\sqrt{MX^2+MY^2+MZ^2}$$

wherein X, Y, and Z correspond to directional components in a Cartesian coordinate system.

15. The method of claim 13, wherein identifying the first and second horizontal regions further comprises comparing the calculated absolute intensity |M| to a plurality of predefined absolute intensity values stored in a memory.

16. The method of claim 15, wherein the plurality of predefined absolute intensity values are stored within the memory as a lookup table, the lookup table including a plurality of horizontal region identifiers and a range of absolute intensity values corresponding to each respective horizontal region identifier, and wherein identifying a horizontal region of a wearable sensor device includes determining if the calculated absolute intensity value |M| is within a range of absolute intensity values corresponding to a particular horizontal region identifier.

17. The method of claim 13, wherein the action event message is configured to cause the remote computing device to output at least one of a synthesized musical note or a preordered sound via a speaker device.

18. A system, comprising:

a first magnet for generating a first magnetic field;

a second magnet for generating a second magnetic field, wherein the first and second magnetic fields are greater than that of the Earth's magnetic field;

wherein the first and second magnets introduce a third magnetic field based on an attraction between poles of the first and second magnets;

a wearable sensor arrangement including a magnetic sensing device; and circuitry disposed in a wearable device to:

receive a signal representing a measured magnetic field strength M and a field direction D from the magnetic sensing device;

identify a first horizontal region of the magnetic sensing device in response to the measured magnetic field strength M corresponding with the first magnetic field; and identify a second horizontal region of the magnetic sensing device in response to the measured magnetic field strength M corresponding with the third magnetic field.

19. The system of claim 18, wherein the first and second magnets have a magnetic field strength greater than that of the Earth's magnetic field.

20. The system of claim 18, wherein the circuitry is further configured to identify a third horizontal region of the magnetic sensing device in response to the measured magnetic field strength M corresponding with the second magnetic field.

* * * * *